W. ELKIN.
BELT SHIFTER.
APPLICATION FILED AUG. 3, 1911.
1,029,495.
Patented June 11, 1912.
2 SHEETS—SHEET 1.
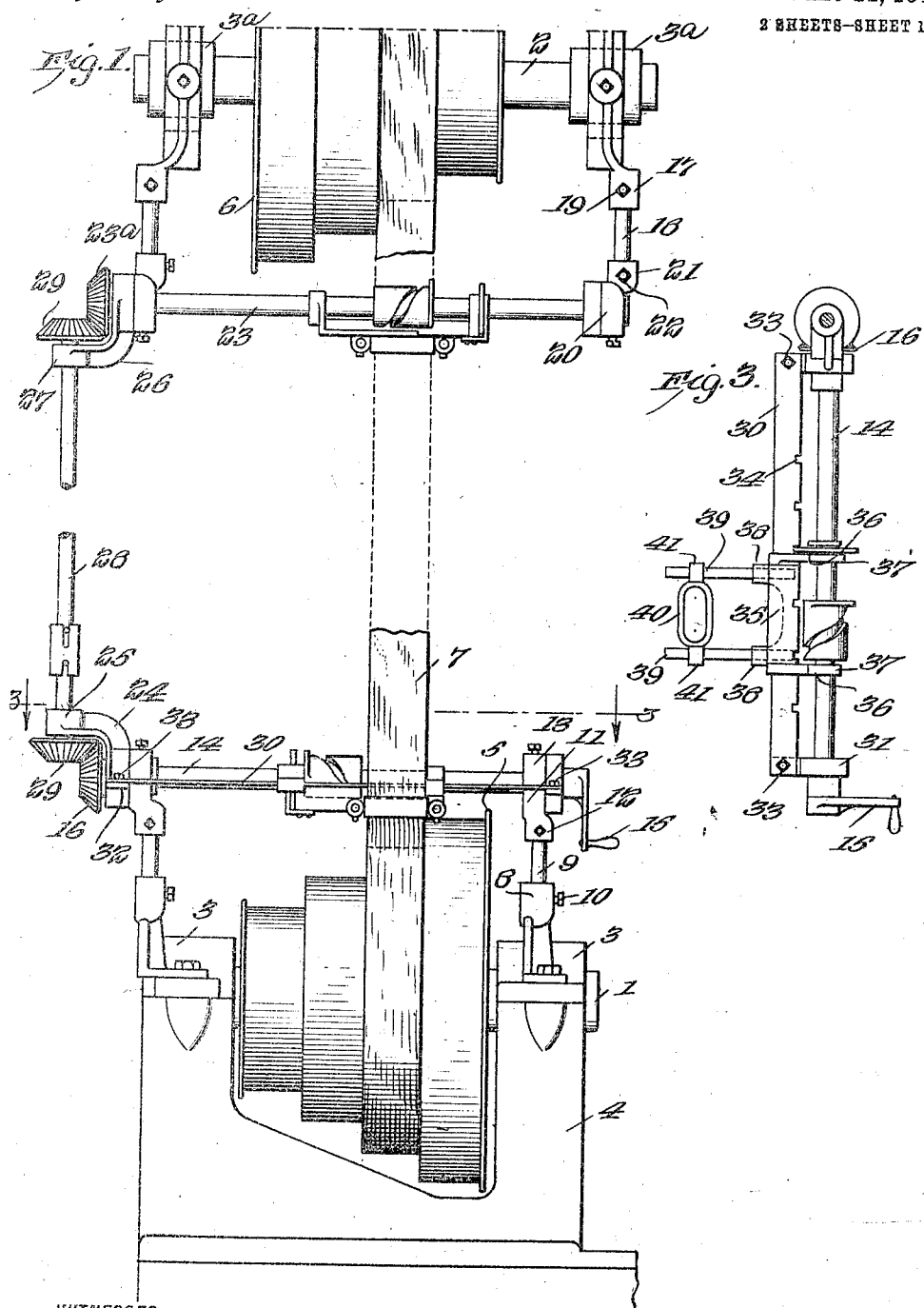

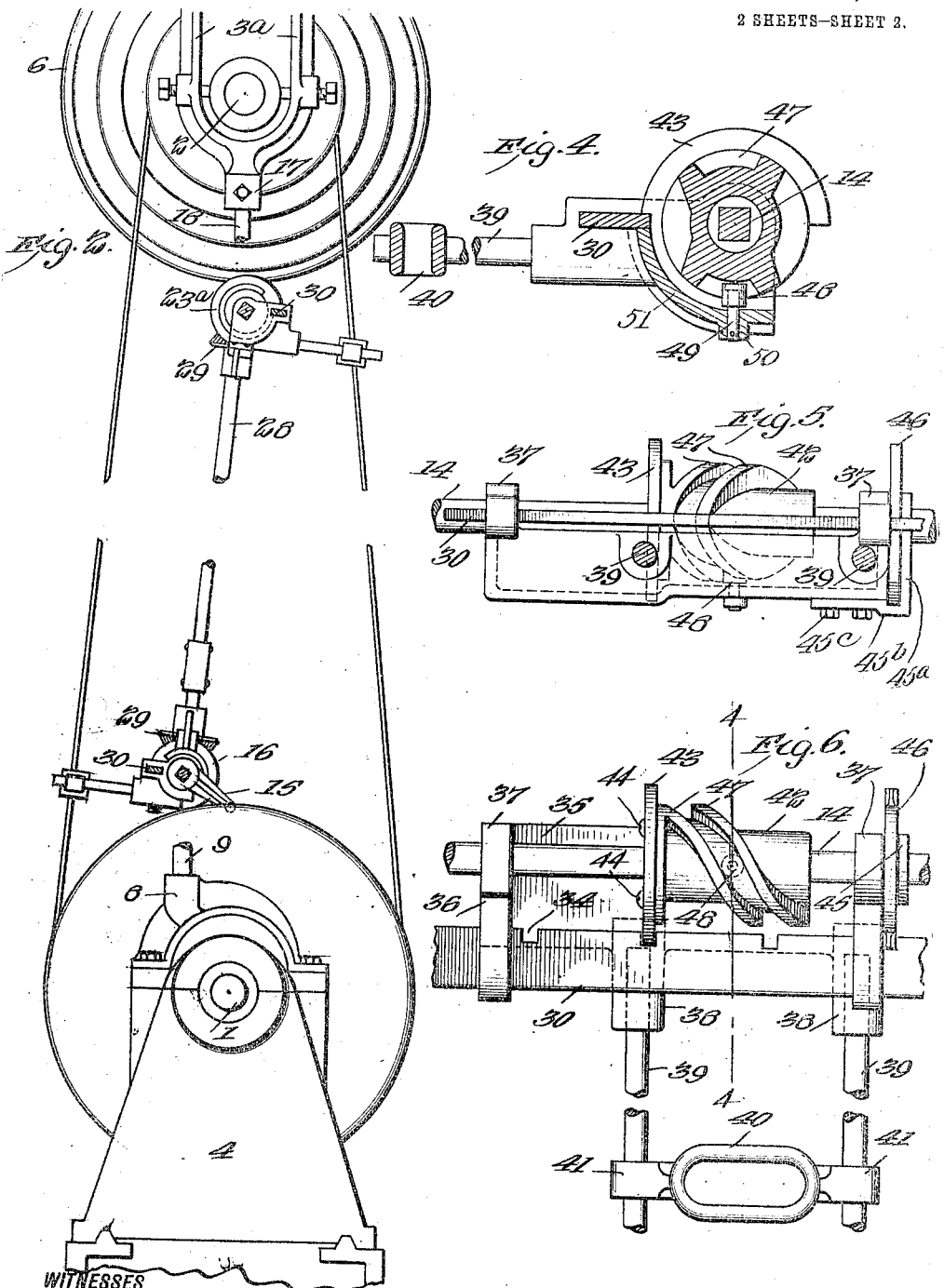

UNITED STATES PATENT OFFICE.

WARREN ELKIN, OF WINCHESTER, KENTUCKY, ASSIGNOR OF TWO-NINTHS TO GEORGE A. GREEN, TWO-NINTHS TO JEFFERSON P. MONROE, AND TWO-NINTHS TO EDWARD J. EGAN, ALL OF WINCHESTER, KENTUCKY.

BELT-SHIFTER.

1,029,495.　　　Specification of Letters Patent.　　Patented June 11, 1912.

Application filed August 3, 1911. Serial No. 642,142.

*To all whom it may concern:*

Be it known that I, WARREN ELKIN, a citizen of the United States, and a resident of Winchester, in the county of Clark and State of Kentucky, have made certain new and useful Improvements in Belt-Shifters, of which the following is a specification.

My invention is an improvement in belt shifters, and has for its object the provision of a simple, easily and positively operated mechanism of the character specified, for shifting a belt on stepped cone pulleys, wherein the shifting mechanism is supported on a traveling carriage, operated by a traveling cam.

In the drawings—Figure 1 is a front view of the improvement, Fig. 2 is a side view, Fig. 3 is a section on the line 3—3 of Fig. 1, Fig. 4 is a section on the line 4—4 of Fig. 6, Fig. 5 is a front view of Fig. 6, and Fig. 6 is a plan view of the cam and carriage.

In the present embodiment of the invention, the shafts 1 and 2 are arranged in parallelism, the former being journaled in sectional bearings 3, on a base 4, and the latter in hangers 3ª. A step pulley 5 is secured on shaft 1, and a similar pulley 6 is secured on shaft 2. Each of the pulleys is composed of four sections, the sections gradually increasing in diameter from one end of the pulley to the other, and the pulleys are oppositely arranged, the largest section of pulley 5 being opposite the smallest section of pulley 6.

A belt 7 connects the registering section, and a mechanism is provided for shifting the said belt from any pair of sections to any other pair. A standard 8 is secured to the base adjacent to each bearing 3, and each standard is provided with a vertical bearing or socket for receiving the lower end of a post 9, which is held in adjusted position by a set screw 10.

A head 11, provided with an opening for receiving the post is supported by each post and is held in adjusted position by a set screw 12, and each head is provided with a bearing 13, which is in alinement with the corresponding bearing of the other head.

A shaft 14 is journaled in the bearings 13, and is provided at one end with a crank 15, and at the other end with a bevel gear 16. The said shaft 14 is polygonal in cross section over a portion of its length as shown in Fig. 4. A socket 17 depends from each of the hangers 3ª for receiving the upper end of a post 18. The post is held in adjusted position, by means of a set screw 19. A bearing 20 is connected with the other end of each post, each head having a socket 21 for receiving the end of the post, and the bearing is held in place by a set screw 22. A shaft 23 is journaled in the bearings 20, and is provided at one end with a bevel gear 23ª.

The head 11 adjacent to the bevel gear 16 is provided with an angular arm 24, having a bearing 25 at its outer end, and the bearing 20 adjacent to the bevel gear 23ª is provided with a similar arm 26, having a bearing 27 at its outer end. A shaft 28 is journaled in the bearings 25 and 27 and the said shaft is journaled with a bevel gear 29 at each end, one meshing with gear 16, and the other with gear 23ª.

A plate 30 is arranged alongside the shaft 14 and is supported by a collar 31 on the shaft between the crank 15 and the adjacent bearing 13, and by a lateral lug 32 on the arm 24. The plate is secured to the lug, and the collar by set screws 33, and is provided with a series of spaced notches 34 on the edge adjacent to the shaft. A carriage 35 is movable on the plate, and the said carriage is provided with a pair of spaced arms 36 extending toward the shaft 14, each arm having a collar 37 and 37 respectively, encircling the shaft. The carriage is also provided with a pair of spaced sockets 38, extending in the opposite direction from the arms. A rod 39 is received in each socket, and a loop 40 is supported by the rods, the said loop being provided at each end with a bearing ring 41, which encircles the adjacent rod. The loop engages the belt, the said belt passing through the loop, and being moved thereby.

A sleeve 42 is mounted on the shaft 14, between the collars 37, and a mutilated disk 43 is secured to one end of the sleeve by means of screws 44. The disk is provided with a polygonal opening, fitting the polygonal portion of the shaft between the two bearings. The disk 43 and the disk 46, to be described, are constrained to rotate with the shaft, but are freely movable longitudinally thereof when the mutilated portion of a disk is in register with the notches, that is, when the unmutilated portions of the said disks are not in engagement with a notch. The said disks are oppositely arranged, the mutilated portion of one being exactly opposite the unmutilated portion of the other. The mutilated portion of each disk extends over 180 degrees of the circumference of the disk, so that when one disk disengages from the notch in the plate 30, the other disk passes immediately into engagement with another notch. The edge of the disk is adapted to engage one of the notches 34. A second mutilated disk 46 is arranged on the shaft, between the adjacent bearing 37 of the carriage and a bearing 45 engaging the shaft on the opposite side of the disk from the bearing 37. The bearing 45 is in the angular portion 45$^a$ of an arm 45$^b$ secured to the carriage by bolts 45$^c$, and the said disk turns freely with the shaft. The sleeve 42 is provided with spaced parallel spiral ribs 47 on its periphery, the said ribs forming a cam groove, for engagement by a roller 48, on a pin or lug 49 in a boss or hub 50, on an extension 51, from the carriage. The said extension curves downwardly and forwardly from the carriage beneath the sleeve (Fig. 4). The shaft 23 is provided with a mechanism for shifting the belt, similar to that just described for shaft 14. The loops 40 engage the belt as before stated, and each loop is freely slidable on the rods 39, to permit the said loop to take a position corresponding to the position of the belt.

In operation, when it is desired to shift the belt from one set of registering pulley sections to the other, the shaft 14 is rotated by means of the crank 15 and through the shaft 28, and the connections between the said shaft and shafts 14 and 23, shaft 23 is rotated at the same rate of speed as shaft 14. The gear wheels 16, 29 and 23$^a$ are of equal size, so that the carriages of the respective shafts move at the same rate of speed when the shafts are rotated. As the shafts 14 and 23 rotate, the disk 43 will engage a notch 34, thus holding the carriage from movement longitudinally of the shaft 14 as long as the disk is in engagement with the notch. The disk 46 is meanwhile disengaged from the plate 30, the mutilated portion of the disk moving adjacent to the inner edge of the plate 30. The roller 48 on the carriage by its engagement with the cam in the sleeve, causes the said carriage to travel with respect to the shaft and the sleeve. This movement continues as long as the mutilated portion of disk 46 is adjacent to the plate 30. As soon however, as the unmutilated portion of disk 43 moves out of contact with the notch, the unmutilated portion of disk 46 moves into a notch, thus locking the carriage from movement longitudinally of the shaft. The sleeve however, at this time is free, and the engagement of the roller 48 with the cam on the sleeve causes the sleeve to move longitudinally of the shaft 14, in the same direction that the carriage has previously moved. The carriage and the sleeve 42 are thus alternately held stationary or locked with respect to the shaft. This alternate movement of cam sleeve and carriage continues as long as the shaft is rotated, and the belt is carried with the carriage. The belt may be shifted from one end of the pulleys 5 and 6 to the other in this manner. It will be noticed that the carriage is approximately twice the length of the sleeve, so that the sleeve, and the carriage move about the same distance each time. The distance moved by the carriage is sufficient to shift the belt from one set of sections to the other.

I claim:

1. In combination with spaced oppositely arranged stepped cone pulleys, and a belt connecting the registering stepped sections of the pulleys, of a shifting mechanism near each pulley, each mechanism comprising a shaft parallel with the axis of the pulley, a sleeve loose on the shaft and provided with a spiral cam groove on its periphery a carriage provided with a bearing engaging the shaft on each side of the sleeve and with a roller engaging the groove, the distance between the bearings being approximately twice the length of the sleeve, spaced parallel rods extending laterally from the carriage, a loop engaging the belt, and provided at each end with an eye sliding on a rod, a fixed plate adjacent to the shaft and provided with spaced notches, a mutilated disk at one end of the cam for engaging the notches to lock the cam, a mutilated disk at the opposite end of the carriage for engaging the notches to lock the carriage, said disks rotating with the shaft, and being oppositely arranged, the mutilated portion of each disk extending over 180° of the circumference of the disk, and means for simultaneously rotating the shafts.

2. In combination with spaced oppositely arranged stepped cone pulleys, and a belt connecting the registering stepped sections of the pulleys, of a shifting mechanism near each pulley, each mechanism comprising a shaft parallel with the axis of the pulley, a sleeve loose on the shaft and provided with a spiral cam groove on its periphery, a carriage provided with a bearing engaging the shaft on each side of the sleeve, the distance between the bearings being approximately twice the length of the sleeve, spaced parallel rods extending laterally from the carriage, a loop engaging the belt, and provided at each end with an eye sliding on a rod, a fixed plate adjacent to the shaft and provided with spaced notches, means connected with the carriage for engaging the notches to lock the carriage during the movement of the sleeve, means connected with the sleeve for engaging the notches to lock the said sleeve during the movement of the carriage, said means being connected with the shaft and being oppositely arranged, a roller on the carriage engaging the groove, and means for simultaneously rotating both shafts.

3. In combination with spaced oppositely arranged cone pulleys, and a belt connecting the pulleys, of a shifting mechanism near each pulley, each mechanism comprising a shaft parallel with the axis of the pulley, a sleeve loose on the shaft and provided with a spiral cam groove on its periphery, a carriage provided with a bearing engaging the shaft on each side of the sleeve, and a roller engaging the groove, the distance between the bearings being approximately twice the length of the sleeve, spaced parallel rods extending laterally from the carriage, a loop engaging the belt, and provided at each end with an eye sliding on a rod, means for simultaneously rotating both shafts, and means in connection with the shaft for locking alternately the sleeve and the carriage.

4. In combination with spaced oppositely arranged cone pulleys, and a belt connecting the pulleys, of a shifting mechanism near each pulley, each mechanism comprising a shaft parallel with the axis of the pulley, a sleeve loose on the shaft and provided with a spiral cam groove on its periphery, a carriage provided with a bearing engaging the shaft on each side of the sleeve, and a roller engaging the groove, the distance between the bearings being approximately twice the length of the sleeve, a loop for engaging the belt slidably connected with the carriage, means for alternately locking the sleeve and the carriage from movement with respect to the shaft, and means for rotating both shafts.

5. In combination with spaced oppositely arranged cone pulleys, and a belt connecting the pulleys, of means near each pulley for shifting the belt, said means comprising a shaft parallel with the axis of each pulley, a sleeve provided with a spiral groove on the shaft, a carriage slidable on the shaft provided with a lug engaging the groove of the sleeve, means for simultaneously rotating the shafts, and means for alternately locking the sleeve and the carriage from movement with respect to the shaft.

6. In combination with spaced oppositely arranged cone pulleys, and a belt connecting the pulleys, of means near each pulley for shifting the belt, said means comprising a shaft parallel with the axis of the pulley, a sleeve movable longitudinally of the shaft and constrained to rotate therewith, a carriage on the shaft, means for simultaneously rotating the shafts, a connection between the sleeve and the carriage for constraining one of the said elements to move longitudinally of the shaft when the shaft is rotated with the other element held from longitudinal movement, and means for alternately locking the said elements from movement longitudinally of the shaft.

7. A belt shifter comprising a shifting means arranged near each end of the belt, said means engaging opposite runs of the belt, and comprising each a shaft arranged transversely to the belt, a sleeve on each shaft, a carriage slidable longitudinally of each shaft, means for simultaneously rotating the shaft, means for alternately locking the sleeve and the carriage from movement longitudinally of the shaft, and a connection between the sleeve and the carriage for moving each element when the other element is locked from movement longitudinally of the shaft.

WARREN ELKIN.

Witnesses:
J. T. HASTINGS,
STONER OGDEN.